United States Patent [19]
Dalton

[11] 3,895,353
[45] July 15, 1975

[54] DATA PROCESSING SYSTEMS

[76] Inventor: Robin Edward Dalton, 20 Constable Rd., Hillmorton, Rugby, Warwickshire, England

[22] Filed: May 2, 1973

[21] Appl. No.: 356,621

[30] Foreign Application Priority Data

May 3, 1972 United Kingdom.............. 20596/72

[52] U.S. Cl. ............................................ 340/172.5
[51] Int. Cl. ............................................ G06f 15/16
[58] Field of Search................ 340/172.5, 146.1 BE; 235/153 AE; 444/1

[56] References Cited

UNITED STATES PATENTS

| | | | |
|---|---|---|---|
| 3,444,528 | 5/1969 | Lovell et al. | 340/172.5 |
| 3,517,171 | 6/1970 | Avizienis | 235/153 AE |
| 3,544,777 | 12/1970 | Winkler | 235/153 AE |
| 3,665,415 | 5/1972 | Beard et al. | 340/172.5 |
| 3,668,644 | 6/1972 | Looschen | 340/172.5 |
| 3,770,948 | 11/1973 | Caputo et al. | 235/153 AE |

*Primary Examiner*—Gareth D. Shaw
*Assistant Examiner*—John P. Vandenburg
*Attorney, Agent, or Firm*—Kirschstein, Kirschstein, Ottinger & Frank

[57] ABSTRACT

An interrupt arrangement for a data processing system, comprising two duplicate units each of which comprises a plurality of storage elements for storing interrupt requests from peripheral circuits. The interrupt arrangement can be interrogated by a processor to reat out the contents of the storage elements. However, in the event of any disparity between the contents of the storage elements in the two duplicates, no such response is obtained, indicating the existence of a fault to the processor. The processor can then apply test instructions to the interrupt arrangement to diagnose the fault. Some of the interrupt elements store immediate interrupts which, in a multiprocessor system, cause interruption of the lowest priority processor.

8 Claims, 11 Drawing Figures

PATENTED JUL 15 1975 3,895,353

SHEET 5

DATA PROCESSING SYSTEMS

This invention relates to data processing systems and, more particularly, is concerned with interrupt arrangements for use in such systems.

Most real-time data processing systems are provided with an interrupt arrangement which will handle requests for processing (interrupt requests) from asynchronous peripherals of the system. Such an interrupt arrangement is fundamental to the operation of the system, and hence security (in the sense of protection against faults) of the interrupt arrangement is extremely important.

In a multiprocessor system, there is the additional problem of deciding which processor should carry out the requested processing. Further problems arise in a data processing system designed to control a telecommunications exchange system in which, typically, there are many peripherals which can produce requests, which must be dealt with in an efficient manner.

A conventional way of ensuring security of a particular item of equipment is to triplicate it, i.e. construct it as three independently operating units. The actions of the three units are compared and a "majority vote" is taken, i.e. if one unit differs from the other two, that unit is assumed to be faulty.

One object of the present invention is to provide an interrupt arrangement in which security is achieved without triplicating the arrangement.

According to the invention, there is provided an interrupt arrangement for use in data processing system which comprises at least one data processor, a plurality of input/output channels, and a plurality of peripherals which are accessible to the processor via the channels, the interrupt arrangement being connectable to a said input/output channel of the system and comprising two duplicate units, each of which comprises: a plurality of storage elements for storing interrupt requests from said peripherals, a request being stored in corresponding elements in both duplicate units; control means responsive to instructions from the processor via said input/output channel to read out contents of selected ones of said storage elements in that duplicate unit for transmission to the processor via the channel; and means for comparing the contents read out of the storage elements in the two duplicate units and for preventing said contents from being transmitted to the processor in the event of any disparity between the duplicate units, thus indicating a fault in one of the duplicate units; the control means also being responsive to further instructions from the processor via said input/output channel to cause predetermined test operations to be performed on said storage elements to locate any faulty elements in that duplicate unit and to lock out any such faulty elements from normal operation, thereby permitting the contents of the corresponding elements in the other duplicate unit to be transmitted to the processor via said input/output channel in the event of a said disparity between the duplicate units.

It will be seen that in an interrupt arrangement in accordance with the invention, security is achieved by duplication rather than by triplication, with a consequential saving in cost. When a fault occurs it is not, of course, possible to tell from a mere comparison of the actions of the duplicate units which unit is faulty. Instead, this is achieved by providing facilities whereby the processor can apply test instructions to the interrupt arrangement, so as to determine which of the duplicates is faulty, and to lock out any regions of the duplicates found to be faulty.

One embodiment of the invention will now be described by way of example with reference to the accompanying drawings of which:

Figure 1:
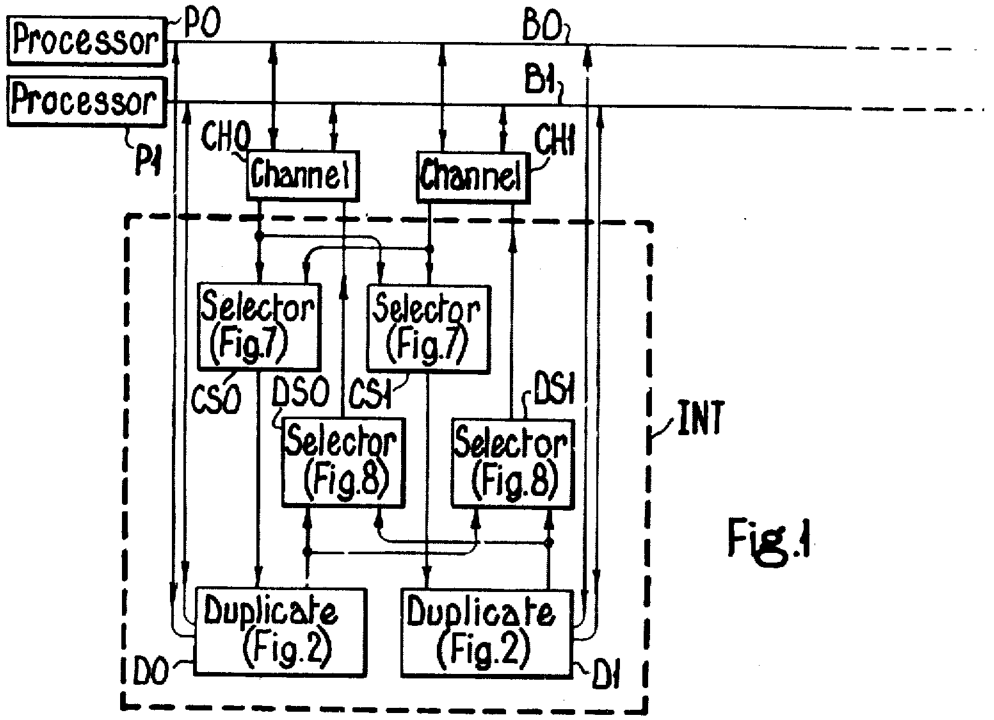
FIG. 1 is a schematic block diagram of a data processing system including an interrupt arrangement in accordance with the invention.

Referring to FIG. 1, the data processing system comprises two data processors P0 and P1, having respective data bus systems B0 and B1. Each data bus system comprises: an 18-wire outgoing data highway; an 18-wire incoming data highway; an 18-wire address highway; four wires constituting a "priority" bus; and two wires constituting an "interrupt bus." Data is transmitted over the incoming and outgoing data highways, and over the address highway, in the form of two eight-bit bytes (referred to as upper and lower bytes), each byte having a parity bit which provides a check on correct transmission of the bytes.

Each of the data bus systems B0, B1 is connected to a number of input/output channels, of which only two, CH0 and CH1 are shown in the drawing. Each channel has a unique address assigned to it, and can be seized by either of the processors P0 or P1 by applying the address of the channel to the upper byte on the address highway. When a channel is seized by a processor, data can be exchanged between the channel and the processor over the incoming and outgoing data highways.

Some of the channels have a large number of sub-channels multiplexed into them, these sub-channels being connected to various items of peripheral equipment of the system. When such a channel is seized by a processor, the lower byte on the address highway is used by the processor to control a multiplexer within the channel, so as to select one of the sub-channels for exchange of data. Others of the channels are not subdivided in this way, but give access to a single peripheral equipment only, the channels CH0 and CH1 being in this category. In the case of channels CH0 and CH1 the lower byte on the address highway is used as a control instruction, as will be described.

The processors P0 and P1 both operate under stored-program control. Operation of the system is divided into a number of modular "processes," each of which performs a certain specified data manipulation function, and has a unique priority level assigned to it. Any process can run on either of the processors, both the processors being of equal status and completely interchangeable. Thus, if one processor is taken out of service, the system can continue operating, albeit with a reduced capacity. When a process is running on a processor, the priority of that process is applied to the "priority" bus of that processor, the purpose of which will be described.

The processes are co-ordinated by means of a special "supervisor" program, which determines which processes are required to deal with the workload of the system, and also initiates any action which may be required to deal with faults in the system.

Data processors, data bus systems, input/output channels, peripheral equipments, and programming arrangements for such data processors are all well known in the data processing art, and do not form any part of the present invention, and will therefore not be described in detail in this specification.

The two channels CH0 and CH1 shown in the drawing serve an interrupt arrangement INT, which forms the subject of the present specification. The interrupt arrangement includes two identical duplicate units D0 and D1 (hereinafter referred to simply as "duplicates"). These duplicates are connected to the channels CH0 and CH1, so as to receive the outgoing data and the address lower byte, by way of two channel selector circuits CS0 and CS1, which will be described below in greater detail with reference to FIG. 7. These circuits CS0 and CS1 are controlled by means of signals from the channels CH0 and CH1, as will be described, in such a manner that, when either channel is seized by a processor, that channel is connected to both duplicates D0 and D1. The duplicates are also connected to the channels, for the transmission of data in the opposite direction, by way of two duplicate selector circuits DS0 and DS1, which will be described below in greater detail with reference to FIG. 8. The circuits DS0 and DS1 are controlled by signals from the channels and from the duplicates, as will be described, in such a manner as to feed data from a selected one of the two duplicates to both channels.

Figure 2:
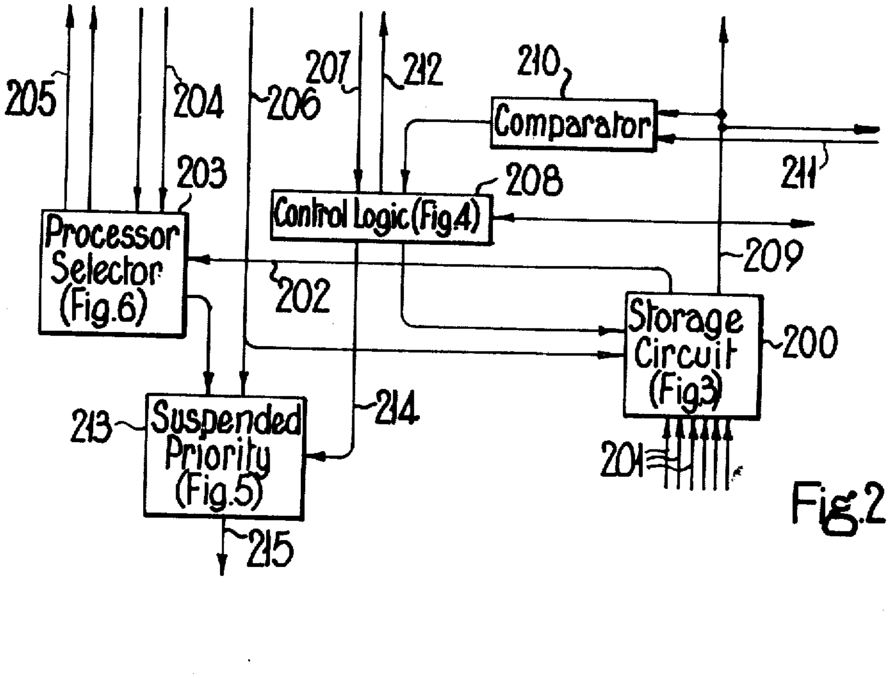
FIG. 2 is a more detailed schematic block diagram of a part of the interrupt arrangement.

Referring now to FIG. 2, this shows the structure of one of the duplicates, D0, in somewhat greater detail.

Each duplicate comprises a storage circuit 200 for storing interrupt requests from peripheral equipment of the system, this circuit being described below in greater detail with reference to FIG. 3. As will be described, this circuit 200 comprises a number of storage elements which can be triggered by interrupt requests appearing over input wires 201 from respective peripherals, each interrupt request being applied to corresponding storage elements in both duplicates. The elements are arranged in 16 groups each containing 16 elements. Some of the elements are arranged to produce an immediate interrupt when triggered, whereas other elements only store the interrupt request for attention by one of the processors P0, P1 at some later time. When an immediate element is triggered, an output signal is produced on wire 202, and is applied to a processor selector circuit 203.

As will be described below in greater detail with reference to FIG. 5, the circuit 203, connected to the "priority" bus of each of the processors, by way of paths 204, continuously compares the priorities on these busses so as to determine which processor is currently running the lower priority process. When an "immediate interrupt" signal is received on wire 202, the selector 203 produces an interrupt signal on one of two wires 205 which are respectively connected to the "interrupt" busses of the two processors, so as to cause the processor which is running the lower priority process to be interrupted.

When either of the processors P0, P1 receives such an "interrupt" signal on its interrupt bus, it stops the process which it is currently running, and stores the register contents associated with that process in a special area of storage, so as to permit that process to be returned to at some later time. The interrupted processor then runs the supervisor program, referred to above. The supervisor program causes the processor to interrogate the interrupt arrangement so as to determine which of the interrupt storage elements contain requests from peripherals, as will be described, and to initiate any action required to service these requests.

Referring still to FIG. 2, as mentioned above, when a processor has seized either of the channels CH0, CH1, it gains access to both duplicates of the interrupt arrangement. The 16 data bits and 2 parity bits from the outgoing data highway of the processor appear on an 18-wire data path 206 in each duplicate. The 16 data bits are fed to "group address" inputs of respective ones of the 16 groups of storage elements in the circuit 200, thus permitting the processor to address any selected one of the 16 groups.

The 8 bits and parity bit of the lower byte from the address highway of the processor appear on a nine-wire data path 207 in each duplicate, and are fed to a control logic circuit 208 in each duplicate as a control instruction. The control logic circuit 208 decodes this instruction, so as to produce various signals for controlling, inter alia, the group of storage elements within the storage circuit 200 which is currently addressed over the path 206. One of these instructions, referred to as the "freeze, read, and reset" instruction causes the contents of the currently addressed group to be "frozen" (i.e. preventing any further incoming interrupt requests from being entered), and then to be read on to a 16 wire interrupt data bus 209, following which the instruction resets the storage elements within that group.

Each duplicate contains a comparator circuit 210, which is connected to the interrupt data bus 209 within that duplicate, and is also connected to the corresponding bus in the other duplicate, by way of path 211.

The comparator 210 compares each of the 16 bits on the bus 209 with the corresponding bit on the path 211, and produces a "disparity" signal, which is fed to the control logic circuit 208, if there is any disparity between these bits. It will be appreciated that the storage circuits 200 in the two duplicates normally contain exactly the same information, so that normally there will be no disparity detected at the comparator 210, and in this situation the control logic circuit in each duplicate produces a "response" signal on a wire 212, which is fed to the selector circuits DS0, DS1 (FIG. 1) so as to permit these circuits to pass data from the interrupt data bus 209 in either duplicate to the channels CH0, CH1, and hence to the processors P0, P1. If, on the other hand, as a result of some fault in the interrupt arrangement, a disparity is detected by the comparators 210 in the two duplicates, no "response" signal is produced (unless the interrupt arrangement is operating in a "non-duplicate" mode, as will be described below). The absence of a response signal at the selector circuits DS0, DS1 prevents data from being fed from the busses 209 to the processors.

Thus, if a processor interrogates the interrupt arrangement, but obtains no response within a predetermined period of time, it is assumed that the interrupt arrangement is faulty, and appropriate action is therefore taken by the supervisor program, within the processor, to ascertain the nature of the fault and to reconfigure the interrupt arrangement so as to remove any faulty parts from service.

For this purpose, the interrupt unit is operable in a "test" mode, by application of suitable "test" instructions to the control logic circuits 208, by way of paths 207, as will be described below. These test instructions permit, inter alia, any of the groups of storage elements, suspected to be faulty, to be "locked out." When a group of elements in one duplicate is locked out, the interrupt arrangement will operate in a "non-duplicate" mode when this group is interrogated, thus permitting data to be read by the processor only from the corresponding group in the other duplicate. The test instructions also permit one of the two duplicates to be completely locked out, as will also be described.

Referring still to FIG. 2, each duplicate also contains a suspended priority circuit 213, which will be described below in greater detail. Briefly, however, the function of this circuit is as follows.

When a process is waiting to run, that process is said to be "suspended." The suspended processes in the system are arranged (by the processors) in a queue, in order of priority, and whenever the supervisor program stops running on a processor, the process which is at the head of this suspended process queue will run on that processor. Before the supervisor stops running, however, it determines the priority of the next process in the queue (i.e. the process which will become the head of the suspended process queue when the supervisor stops), and applies a binary number representing this priority, via the outgoing data highway of the processor, to the path 206 (FIG. 2) and hence to the suspended priority circuit 213. At the same time, an instruction (referred to as the "load suspended priority register" instruction) is applied to the control logic circuit 208, causing the circuit 208 to produce a signal on wire 214, which clocks the priority information from the path 206 into a special register (referred to as the "suspended priority register") within the circuit 213. The contents of the suspended priority register are compared continuously with the priority of the lower priority process currently running on the processors, as supplied by the processor selector circuit 203, and if, at any time, the priority of the suspended process is found to be higher than that of a currently running process, an interrupt signal is generated, on wire 215, this signal being applied to one of the immediate interrupt elements of the storage circuits 200.

Thus, it will be seen that the suspended priority circuit 213 ensures that no process is allowed to continue running in preference to a higher priority suspended process.

Figure 3:
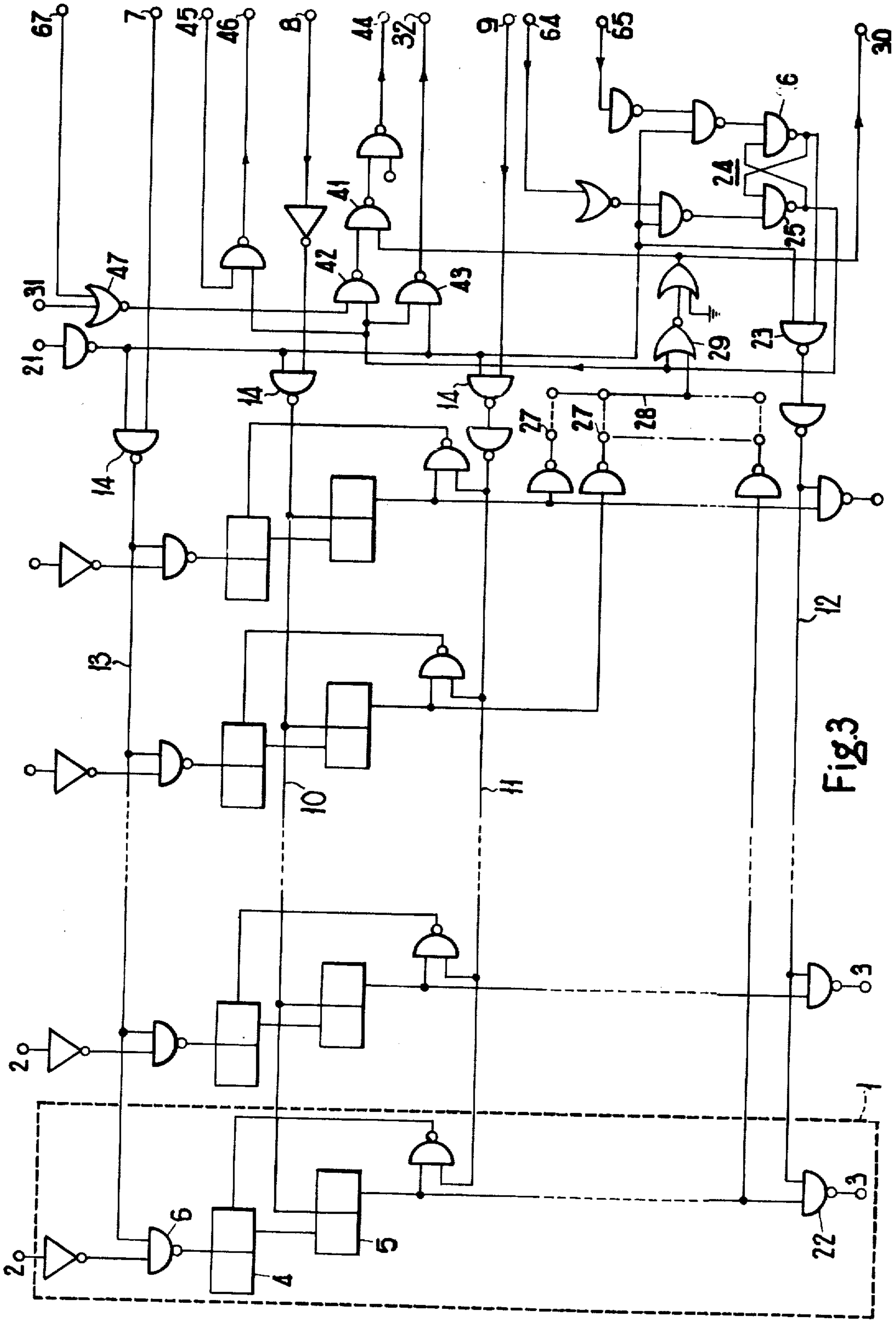
FIGS. 3 to 6 are logic circuit diagrams of parts of the interrupt arrangement shown in block form in FIG. 2.

Reference will now be made to FIG. 3 which shows the storage circuit 200 of FIG. 2 in greater detail. FIG. 3 shows part of one group of 16 storage elements, the omitted portions of the group following the pattern of that shown. The circuitry of each element is as shown within the broken line 1. Each element has an input terminal 2 connected to a respective peripheral equipment of the system, and an output terminal 3. The 16 output terminals 3 are in wired-OR connection with the respective output terminals of the 15 other groups and to the interrupt data bus 209 (FIG. 2).

Each interrupt element has a primary toggle (bistable circuit) 4 and a second toggle 5. The toggle 4 stores a request for an interrupt when an asynchronous input trigger signal 1 at terminal 2 is applied via an inverter to an OR-gate 6. (Gates will be referred to by their circuit function rather than by their structure as indicated by the symbol; hence gate 6 is a NAND-gate having an OR function. Structurally, all AND and NAND gates are shown with a straight input face while OR and NOR gates are shown with concave input faces.) The state of toggle 5 normally follows that of the toggle 4 but can be 'frozen' when a 0 is applied to its clock input by way of wire 10.

Thus the outputs of the toggles 5 become a 1 following trigger inputs to their respective input terminals 2 and can be frozen as a group at any instant by a 0 on the common wire 10. The output of each toggle 5 is AND-gated with a common "reset" signal on wire 11 to provide a "reset" input to the corresponding primary toggle 4.

The outputs of the toggles 5 are gated by a common "read" signal on wire 12 onto the interrupt data bus by way of the output terminals 3.

An alternative clock input to the toggles 4 by way of the OR-gates 6 is provided from a group-trigger terminal 7 by way of wire 13, and is used for checking operation of the group in the test mode. The common clock input to the toggles 5 on wire 10 is derived from a 'freeze' terminal 8, and the common reset signal on wire 11 is derived from a reset terminal 9. The group-trigger, freeze and reset signals are applied in common to similar terminals 7, 8 and 9 in each of the other 15 groups. Any particular group can be addressed by means of a group address signal (0) applied to a group address terminal 21 of the chosen group from path 206 (FIG. 2), which gates these signals onto the respective wires 10, 11, 12 by way of respective gates 14.

A common read signal for the group is applied to output gates 22 from a gate 23 and is derived from the group address signal at terminal 21. The inhibiting input to gate 23 is derived from a group lock-out toggle 24, which prevents any read-out from the group when set in a "lock-out" condition. The toggle 24 comprises two gates 25 and 26 whose outputs are normally 0 and 1 respectively, but are reversed when set in the "lock-out" condition. The state of the toggle 24 is controlled by "set" and "reset" signals at terminals 64 and 65 respectively, which are gated with the group address signal from terminal 21.

In addition to being gated onto the interrupt-data-bus, the outputs of the toggles 5 are applied to strapping points 27 where they are commoned with the corresponding outputs of other groups. Any peripheral equipment that requires an immediate interrupt of a processor has its appropriate strapping point 27 strapped to a bus 28.

Such an immediate interrupt is applied by way of a gate 29 to an output terminal 30, the signal then being supplied to a terminal 31 of the other duplicate. Thus each duplicate normally has two immediate interrupt signals available, a local one (at terminal 30) and an incoming one (at terminal 31). The local one is applied by way of an OR-gate 41 to a terminal 44, which is in turn connected by way of wire 202 (FIG. 2) to the processor selector circuit 203, thereby causing interruption of the processor running the lower priority process, as previously described.

When the lock-out toggle 24 is set in its lock-out state, it applies an inhibiting input to the gate 29, and thus prevents the local interrupt signal from being passed either to the other duplicate by way of terminal 30 or to the OR-gate 41. However, in this condition a gate 42 is enabled by the lock-out signal and the incoming interrupt signal from terminal 31 is applied to gate 41 instead, to provide an interrupt signal to the processor selector 203 (FIG. 2). Thus in this circumstance both duplicates are able to provide their interrupt signals at terminals 44.

The lock-out condition of a group is read by the group address signal at gate 43 and passed to the control logic circuit of the other duplicate by way of terminal 32. In addition, the lock-out condition of the group can be read, by a signal at terminal 45, onto a terminal 46.

As will be described, the control logic circuit 208 (FIG. 2) of each duplicate has a toggle referred to as the "partition toggle" which is set when the other duplicate is found to be faulty or when separate working is required for any other reason. Each partition toggle provides an 'inhibit' signal (a 1) to a terminal 67 in the storage circuit of the other duplicate. This is combined in an OR-function by gate 47 with the interrupt signal at terminal 31, so as to produce an interrupt signal at terminal 44 irrespective of the operation of this duplicate.

Referring now to FIG. 4 the control logic circuit 208 (FIG. 2) for one of the duplicates is shown.

The address lower byte, derived from the appropriate channel selector circuit CS0 or CS1 (FIG. 1) is applied to the terminals 47/0–47/7, (FIG. 4A) the suffixes indicating the bit numbers. A parity bit applied to terminal 48 gives the nine-bit lower byte even parity. Two further bits, representing the results of parity checks for the upper and lower bytes of the 16-bit incoming data word are applied to terminals 49, from the channel selector circuit.

There are two modes of operation of the control logic circuit, a test mode and a normal mode, the mode being determined by the most significant of the address lower byte, at terminal 47/7, 0 indicating test mode and 1 indicating normal mode.

In the test mode the four least significant bits of the address, at terminals 47/0–47/3 are gated to input terminals 61 of a decoder 60 (FIG. 4B) by way of gates 51, which are enabled by the bit 0 at terminal 47/7, subject to a bit 0 at terminal 47/5 indicating that 'this-duplicate-is selected.' The connections to terminals 47/5 and 47/6 are reversed in the other duplicate. Thus, in the test mode one or other (or both) of the duplicates can be selected according to the bits applied to terminals 47/5 and 47/6. The enabling signal to gates 51 can be inhibited by a 1 input to gate 62 (indicating a parity fault) derived from a parity check circuit 52 in conjunction with the parity check result bits at terminals 49.

The decoder 60 (FIG. 4B) normally provides a 1 at each of 10 outputs, one of which becomes a 0 according to the four-bit input code at its input terminals 61. The decoder outputs are applied to "clear" inputs of 10 corresponding toggles T0 to T9 each of which has two outputs, denoted by Q and $\bar{Q}$, these toggles being clocked in unison by a sub-channel clock signal at terminal 63. These toggles, respectively register 10 different test mode instructions, according to the instruction applied to the decoder input 61 from terminals 47/0–47/3.

The instructions registered by the toggles T0–T9 are as follows. T0 and T1 provide the "set" and "reset" signals to the group lockout toggle 24 of FIG. 3 by way of terminals 64 and 65. Toggle T2 provides the 'group-trigger' signal at terminal 7 in FIG. 3, and also a signal on a terminal 53. Toggles T3 and T4 provide set and reset (0) signals for a partition toggle 66. In operation of the system, this toggle 66 is set (by the action of a processor applying suitable "test mode" instructions to the duplicate) in the event of a fault in the other duplicate or if separate working of this duplicate is required for any other reason. A lock-out signal is applied from this toggle to gate 47 (FIG. 3) of the other duplicate, by way of terminal 67.

Toggle T5 provides a 'read-group-lockout' signal for application to terminal 45 of FIG. 3.

Toggle T6 provides a 'test-read' signal, on terminal 50, the purpose of which will be described later.

Toggle T7 is referred to as the "test-mode-toggle" and is set to a state in which its Q output is 1 in the test mode for a number of instructions. Its $\bar{Q}$ output is connected to a terminal 54.

Toggles T8 and T9 provide further functions which are not essential to an understanding of the invention and will therefore not be described herein.

Figure 4A:
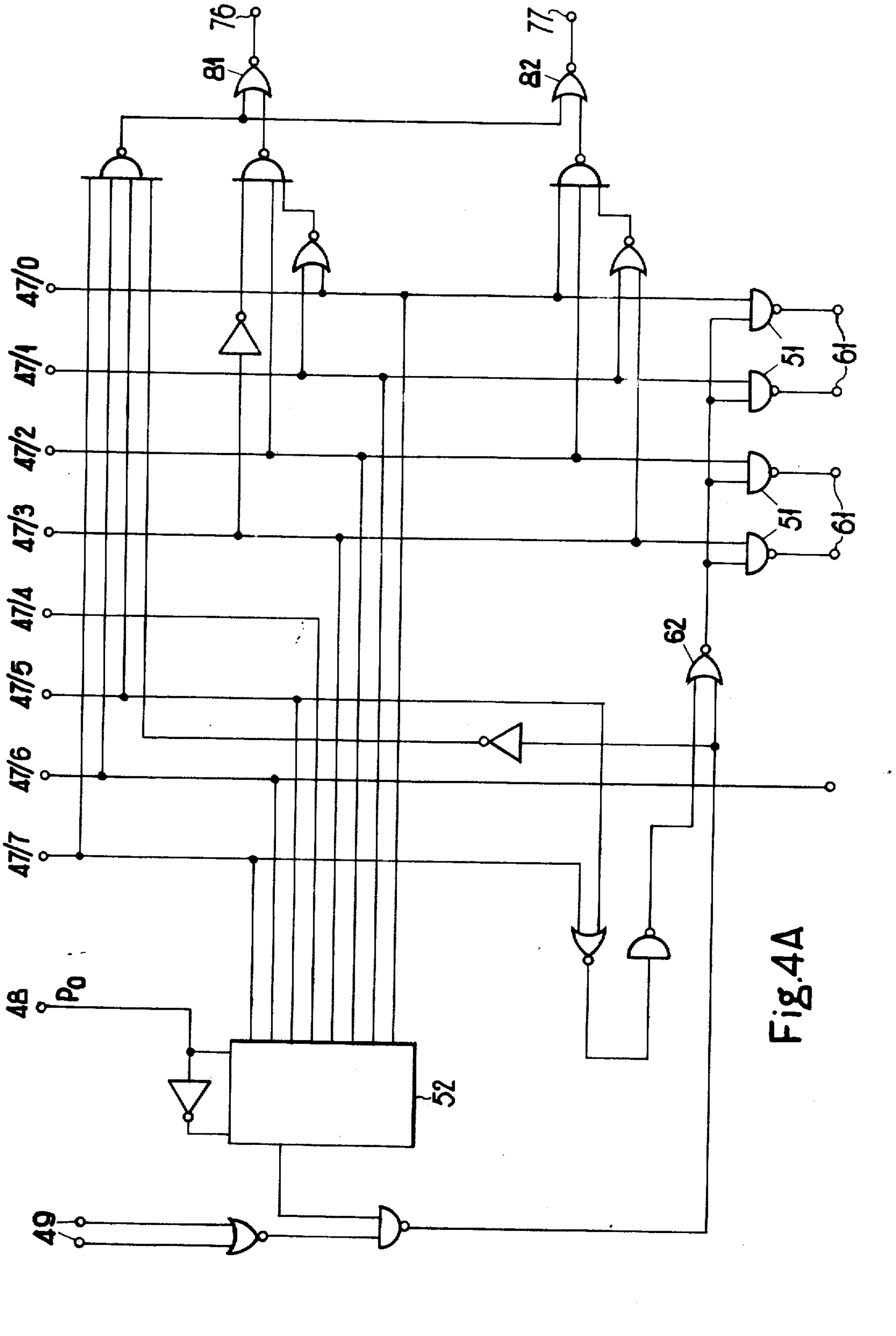
Figure 4B:
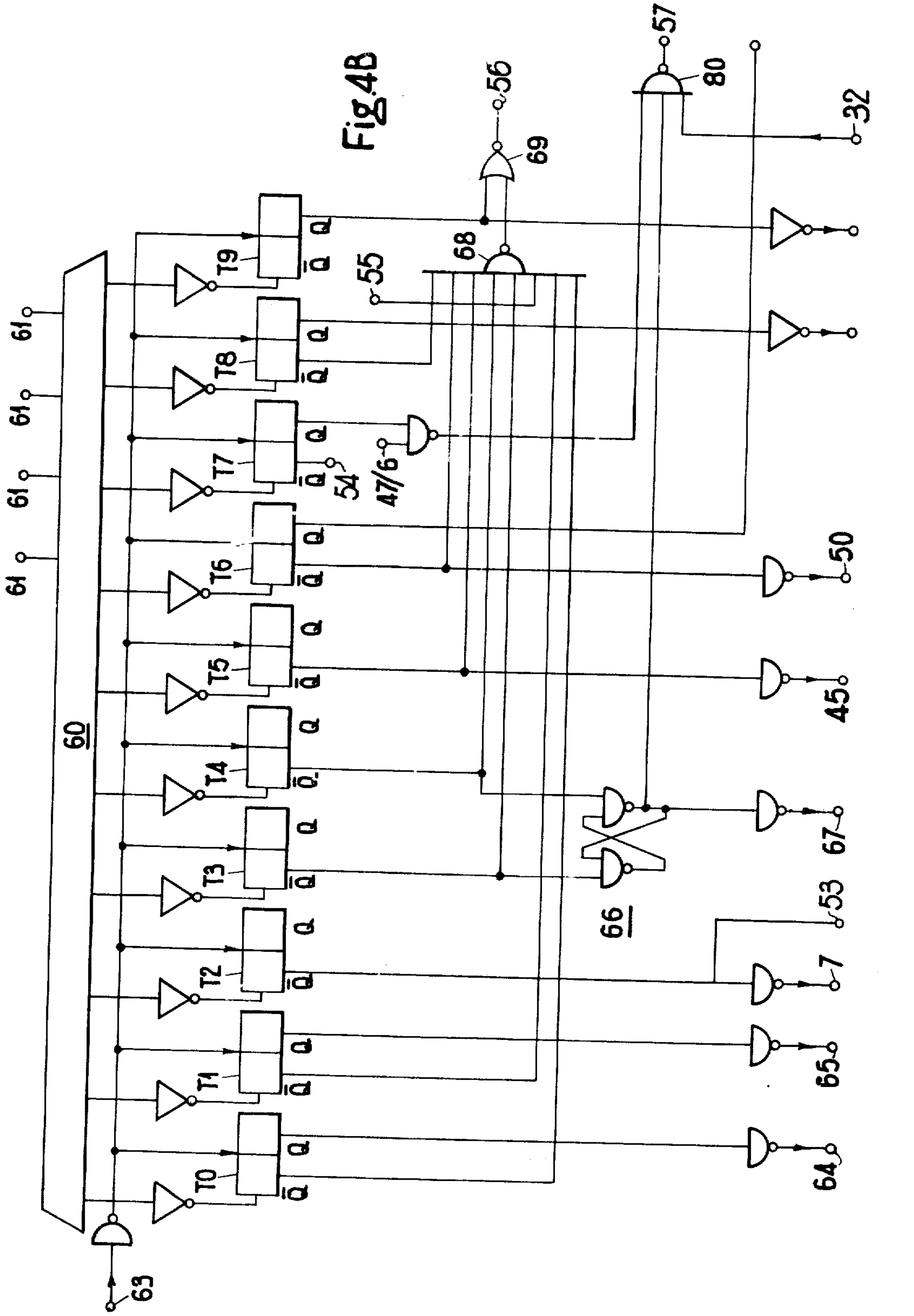

The $\bar{Q}$ outputs of toggles T0, T1, T3, T4, T5, T6, T8, T9 and of a further toggle T11 yet to be described (on terminal 55) are applied to gates 68, 69 in FIG. 4B in an overall OR-function to provide a signal at terminal 56. This signal is applied to a further gate 70 (FIG. 4C) to OR-gate it with the $\bar{Q}$ output of toggle T2, at terminal 53, so as to provide a "response" signal on terminal 89, by way of OR gate 90, whenever any of these toggles registers a test mode instruction. The function of the "response" signal will be described later.

A further gate 80 (FIG. 4B) is arranged to provide a 1 output on terminal 57 in various conditions in which this duplicate is required to work independently of the other. One such condition accompanies the 'test-read' instruction in which toggle T6 is set and the instruction specifies an operation on only one duplicate. In this case bit No. 6 of the address lower byte (from terminal 47/6) together with the Q output of test-mode toggle T7 are gated together to produce a 0 input to gate 80.

A second occasion for separate working of the duplicate is when the partition toggle 66 is set indicating the lockout of the other duplicate. An input to the gate 80 is therefore derived from the partition toggle 66.

A further occasion for separate working is in the event of a particular group in the other duplicate being locked out. For this reason an input for the gate 80 is derived from gate 43 in FIG. 3, by way of terminal 32, in common with the outputs of similar gates in other groups.

Figure 4C:
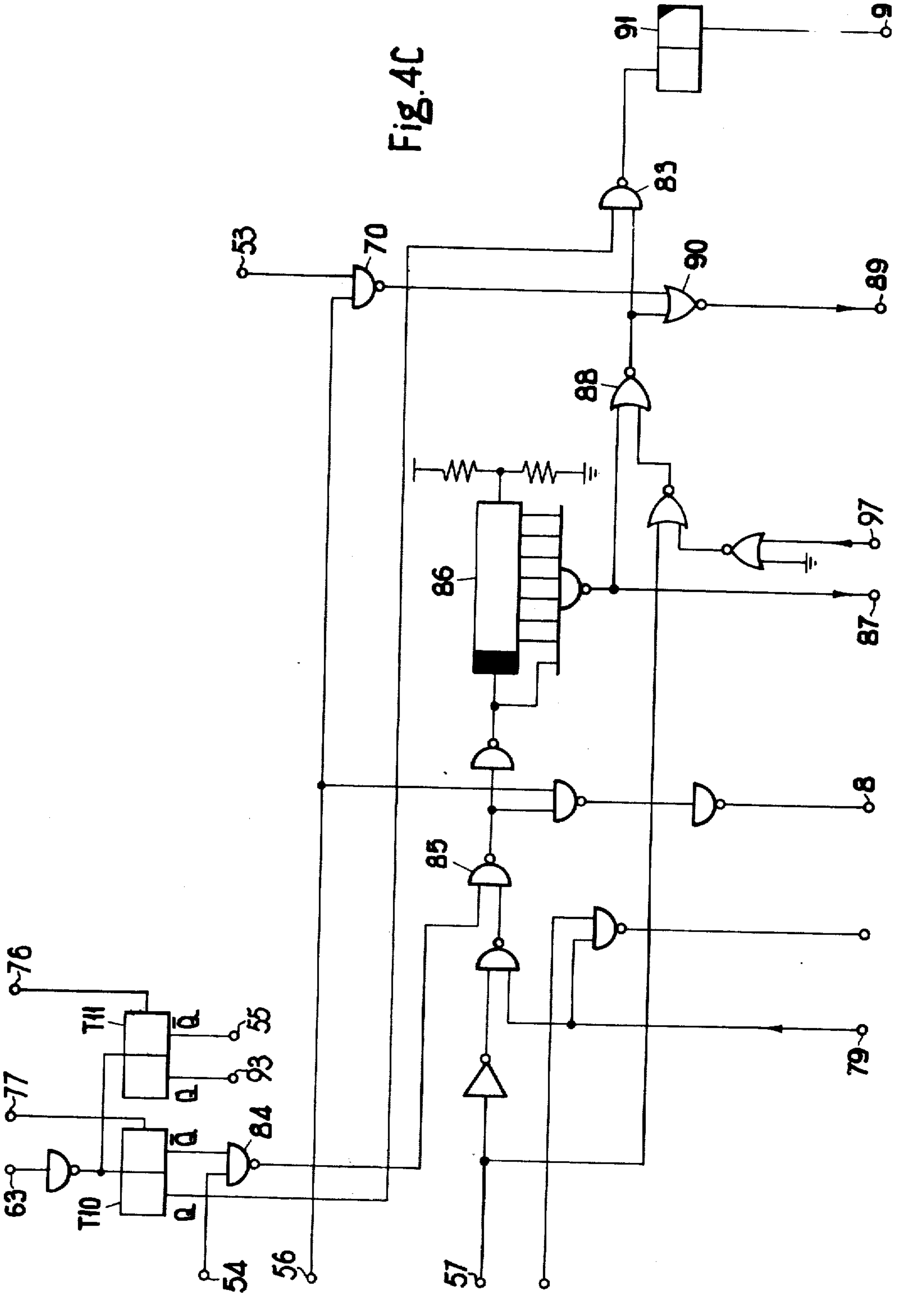

Turning now to the normal mode of operation and referring to FIGS. 4A and 4C, the sub-channel address is decoded by two gates 81 and 82 (FIG. 4A). Gate 81 decodes bits 0–3, 5–7 and an overall parity bit to produce a 1 output at terminal 76 if these bits are equal to 111 and 0100 respectively, this being the "load suspended priority register" instruction. The 1 at terminal 76 is applied to the "clear" input of toggle T11 (FIG. 4C) and allows the subchannel clock on terminal 63 to set it. The $\bar{Q}$ output of toggle T11 is applied as one input to the OR-gate 68 as previously mentioned, by way of terminal 55. The function of this toggle in loading the suspended priority register will be described subsequently.

Gate 82 decodes bits 0–3 and 5–7 to produce a 1 output at terminal 77 if these bits are equal to 111 and 0101 respectively, this being the "freeze, read, and reset" instruction. The 1 at terminal 77 is applied to the "clear" input of a toggle T10, (FIG. 4C) referred to as the 'normal-mode' toggle. An OR-gate 84 (FIG. 4C) provides a 1 to inhibit a gate 85 when either the test-mode toggle T7 is set, producing a 0 on terminal 54, or the normal-mode toggle T10 is set. This gate 85 is also inhibited by the presence of a "disparity" signal 1 at terminal 79, derived from the comparator circuit 210 (FIG. 2). A "freeze" signal is therefore provided for terminal 8 of FIG. 3 in any of the following circumstances:

1. When any of the toggles except the group-trigger toggle T2, the test-mode toggle T7 or the normal-mode toggle T10, is set.
2. When the test-mode toggle T7 or normal-mode toggle T10 is set and an "identity" signal 0 signal is received from the comparison unit on terminal 9, indicating identity of the interrupt data on busses 209.
3. When the test-mode toggle T7 or normal-mode toggle T10 is set and a non-duplicate mode is indicated by a 1 output from gate 80 on terminal 57.

When an "identity" signal 0 is received on terminal 79, it is applied to a persistance check circuit 86 to ensure a sufficient duration of the identity. The output of this check circuit 86 is then applied by way of terminal 87 to the other duplicate where it is received at a terminal corresponding to terminal 97. Thus each duplicate is provided with an indication of identity from its own comparison unit and also from that of the other duplicate.

The two identity indications are applied to an AND-gate 88 where the coincidence of identity indications produces a 0 response output to terminal 89 by way of an OR-gate 90.

If it should happen that a 'freeze' signal just catches a particular interrupt trigger signal in one duplicate but not in the other, the identity signal at terminal 79 will be absent and the 'freeze' signal on terminal 8 will therefore be removed by the inhibiting of gate 85. The 'missed' trigger signal is then allowed into both duplicates, so that an identity signal will now appear at terminal 79, and a 'freeze' signal will now be produced. The operation then proceeds to the production of a response signal at terminal 89 as described above. The response signal on terminal 89 is applied to the duplicate selection circuits DS0, DS1 (FIG. 1) together with a similar response signal from the other duplicate, to enable a choice of duplicate to be made for feeding to the channels CH0, CH1, as will be described.

When the identity condition between the two duplicates has persisted for long enough to satisfy the persistence check circuit 86, gate 83 will produce a 0 to immediately trigger a monostable element 91. For the duration of this monostable delay a reset signal is applied by way of terminal 9 to reset any of the trigger storage toggles 4 of FIG. 3 that have been set. This completes the execution of the "freeze, read and reset" instruction.

Figure 5:
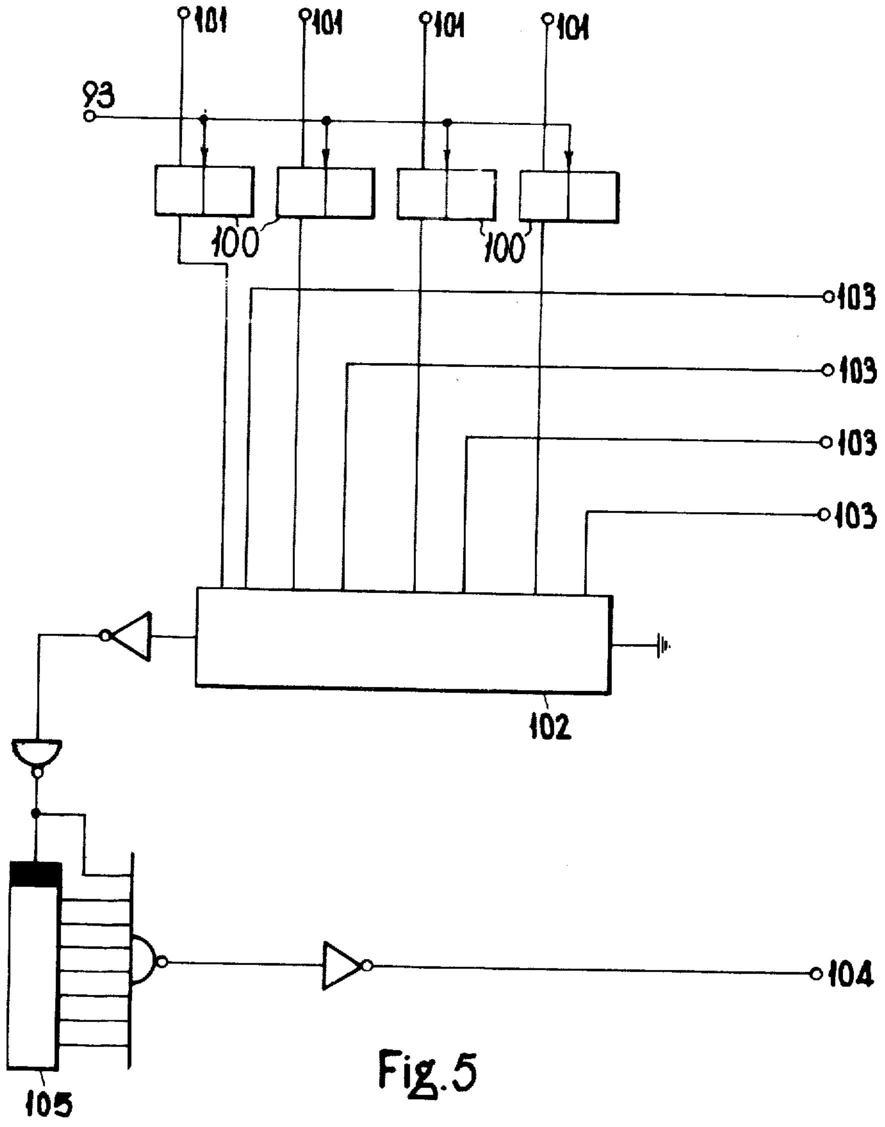

Referring now to FIG. 5, the purpose of the "load suspended priority register" instruction will be explained. This Figure shows the suspended priority register comprising four toggles 100 which receive four-bit data from the data path 206 (FIG. 2) at terminals 101 giving the priority of the next head of the suspended process queue. This register is clocked by a 1 signal on terminal 93 from the Q output of toggle T11 in FIG. 4C on receipt of the "load suspended priority register" instruction.

The priority read into the suspended priority register is applied to a four-bit adder unit 102. Also applied to this adder unit, by way of terminals 103, is the four-bit priority of the lowest priority process currently running on a processor, from the processor selector 203 (FIG. 2).

The adder unit 102 is such that it produces a 1 output if the suspended process priority is greater than that of the lowest running process priority. A persistence circuit 105 checks the duration of the 1 output and if this duration is sufficient the circuit produces an interrupt output at terminal 104, which is connected to one of the "immediate interrupt" inputs of the storage circuit 200, as previously explained.

Figure 6:
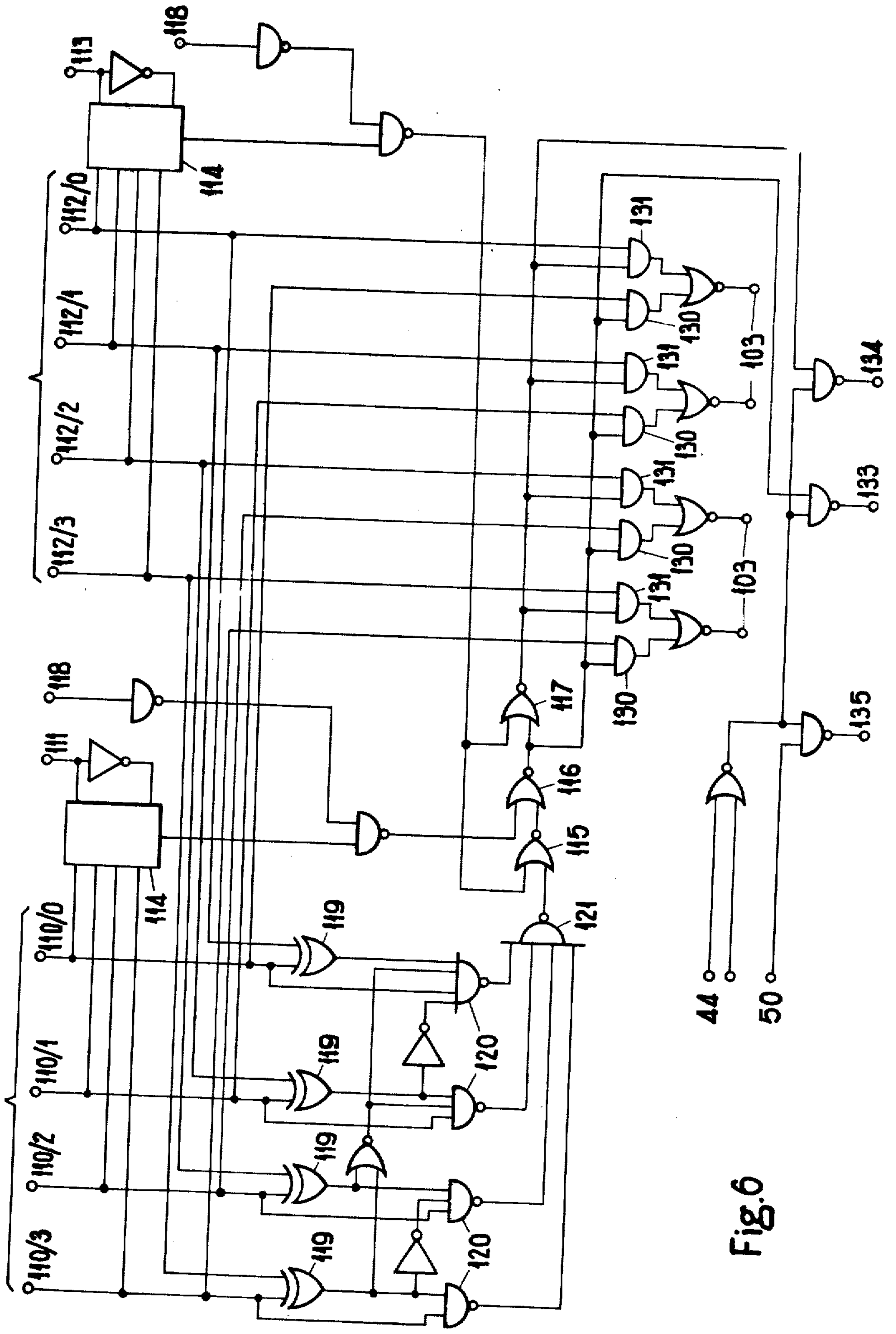

The processor selector circuit 203 (FIG. 2) will now be described with reference to FIG. 6.

The four-bit priority of the process running on processor P1 is applied (after inversion) together with a parity bit on a dedicated bus 204 from the processor to priority terminals 110/0 to 110/3 and parity bit terminal 111. Similarly, the process priority (inverted) of processor P0 is applied to terminals 112/0–3 and 113. The parity of the priority data is checked by a respective circuits 114 which together enable a succession of gates 115, 116 and 117.

An extra input terminal 118 is provided in respect of the two sets of priority data by means of which one or other set can be locked out if a processor proves to be faulty.

Corresponding bits of the two priority words are applied to respective non-equivalence gates 119 which produce a 1 output if their inputs differ. The output of each gate 119 is applied to an AND gate 120 which also receives an input from the associated processor P1 priority bit. Thus the most significant, i.e. left-hand-side, gate 120 is enabled, producing a 0 if the most significant bits are different and the most significant P1 bit is a 1 (i.e. P1 has the lower priority). The output of each gate 119 is applied to each less significant gate 120 so as to disable it if the said output was a 1. The only gate 120 that will be enabled, to produce a 0 output, is the most significant one (if any) for which the P1 and P0 bits differ, and then only if the P1 bit is a 1. This 0 output would enable the OR-gate 121 and produce a 1 and a 0 at the input and output respectively of the gate 117. In the event of the most significant difference being in favour of the P0 bit, no gate 120 will produce a 0 and the above input and output will be reversed.

One of two sets of gates, 130 and 131, is enabled according to the input and output of the gate 117 so passing the lower priority data to four output terminals 103 for comparison with the suspended process priority in the circuitry of FIG. 5.

The signals at the input and the output of gate 117 are also applied as interrupt outputs to terminals 133 and 134 for application to the processor interrupt busses over wires 205 (FIG. 2). These outputs are gated with the interrupt signal received from the storage circuit 200 by way of terminal 44 (FIG. 3). This same interrupt signal is here gated with the 'test-read' signal from the control logic circuit (terminal 50, FIG. 4B) to produce a signal on terminal 135.

One of the channel selector circuits CS0, CS1 of FIG. 1 will now be described with reference to FIG. 7. The eight-bit address lower byte from channel CH1 is applied to terminals 140 and that from channel CH0 to terminals 141. The respective parity bits are applied to terminals 144 and 145 and sub-channel clock signals from the channels to terminals 142 and 143.

In order to select the address from channel CH0 or that from CH1, duplicated routing signals are applied, from each channel, to terminals 146 or 147 according to which channel has been seized by a processor. Each of the two routing signals enables a particular set of gates 148 or 149 to select the address lower byte from the channel which has been seized, for application to the appropriate duplicate.

The sub-channel clock signal from terminal 142 or 143 is checked for the required duration in a persistence check circuit 150 and applied to the command toggles of FIG. 4 by way of terminal 463.

Figure 7:
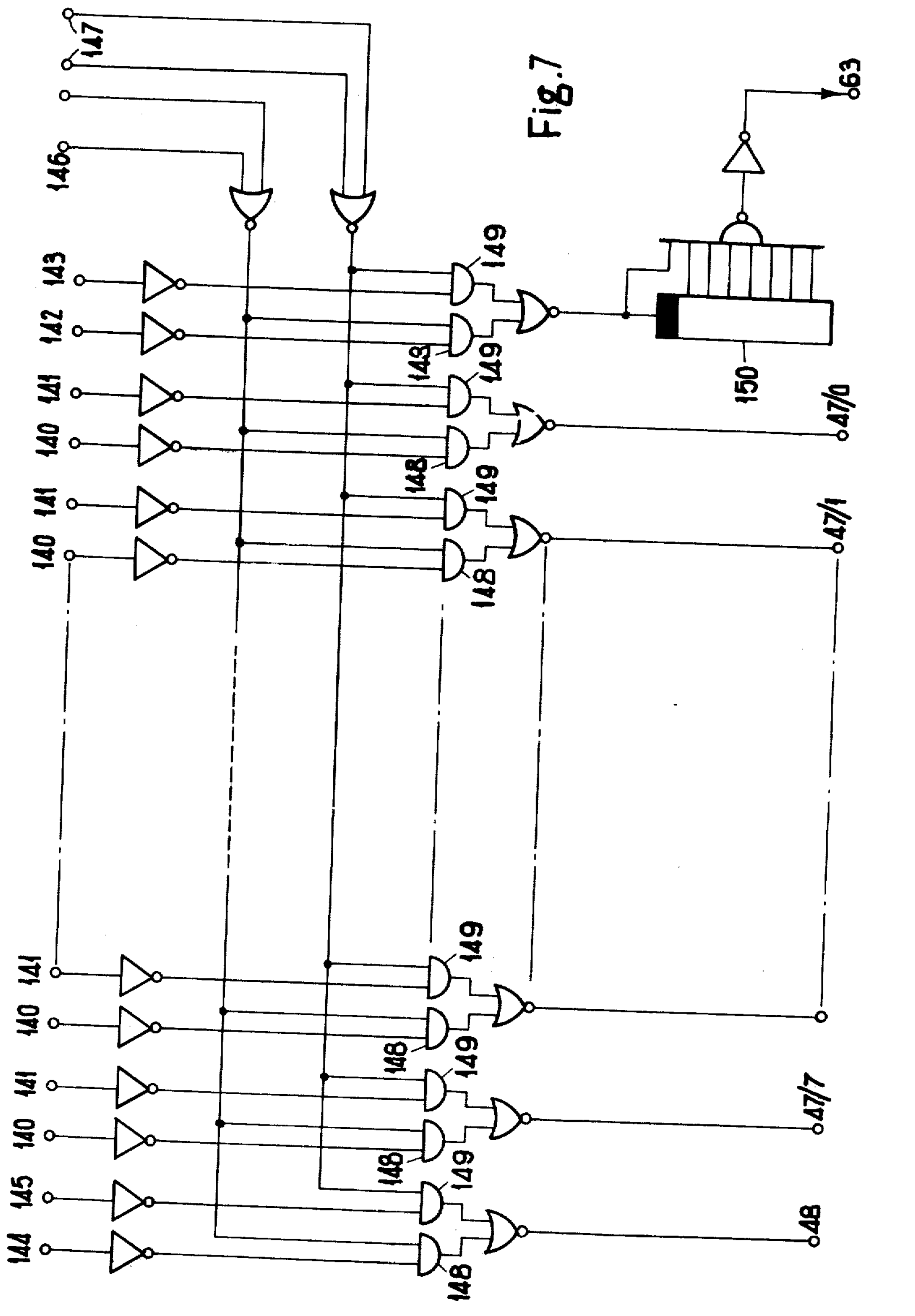
FIGS. 7 and 8 are logic circuit diagram of parts of the interrupt arrangement shown in block form in FIG. 1.

The channel selecting circuits CS0, CS1 also contain further gating circuits, similar to that shown in FIG. 7, for routing data from the outgoing data highways to the duplicates by way of either of the channels CH0 or CH1. The route is dictated by the same signals that are applied to terminals 146 and 147 of FIG. 7. These signals are applied to enable one of two sets of gates each set of nine gates for the eight-bit data plus a parity bit. The parity is checked and a check signal sent to one of the terminals 449 of FIG. 4A. Two such channel selecting units operate together for the upper and lower data bytes.

Figure 8A:
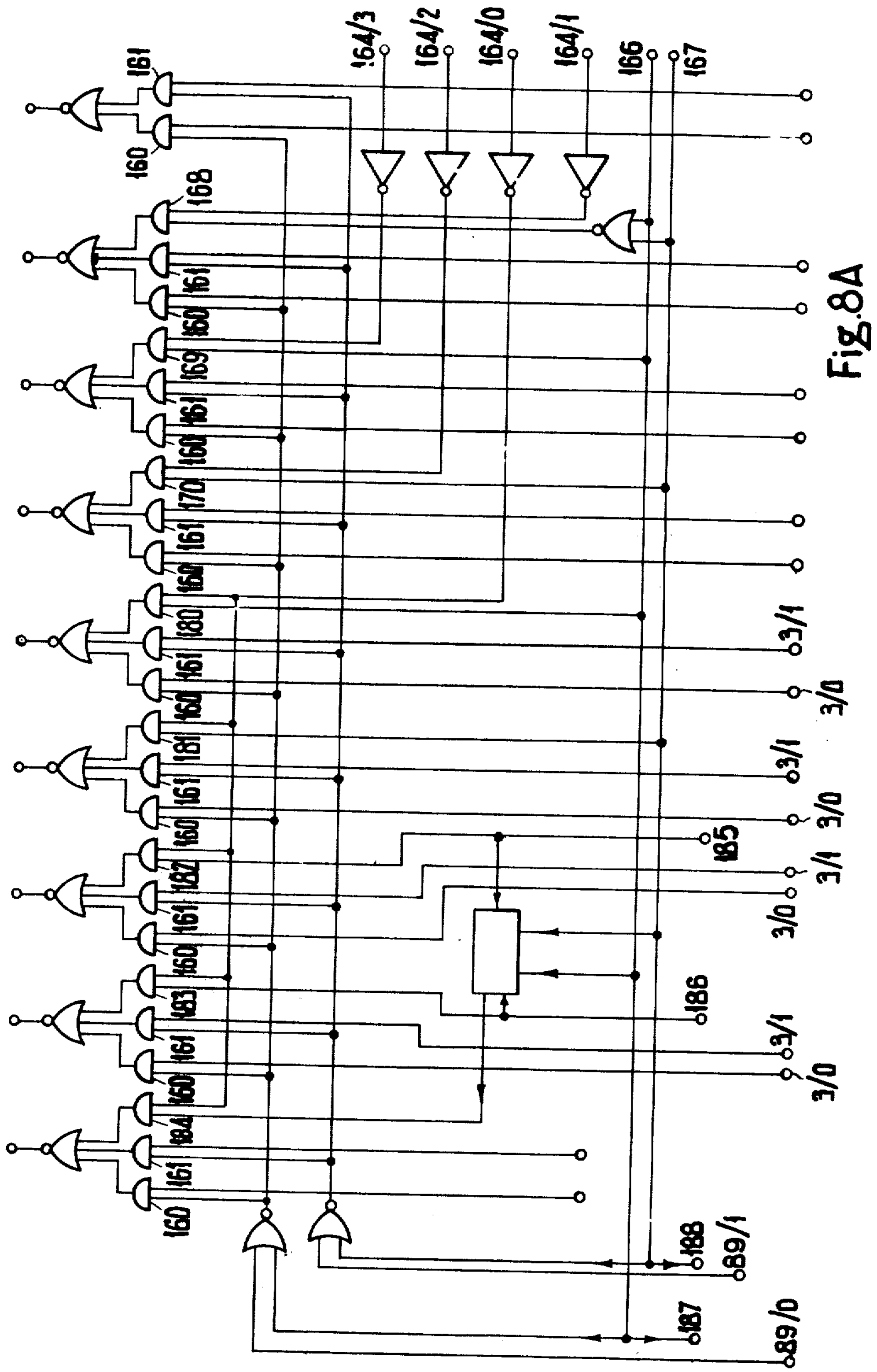

One of the duplicate selector circuits DS0, DS1 (FIG. 1) will now be described in greater detail with reference to FIG. 8, which shows one half of one of these circuits, for handling the eight-bit lower byte (plus parity bit) from the interrupt data bus 209 (FIG. 2). The other half of the circuit is similar to that shown in FIG. 8, and handles the upper byte. Interrupt data is received from both duplicates and the circuitry of FIG. 8 effects the choice between these two sets of interrupt data (which will normally be identical). The input terminals from the two duplicates are accordingly referenced 3/0 and 3/1 to associate them with the terminals 3 of the respective storage circuits (FIG. 3) in duplicates D0 and D1. Thus, in FIG. 8A eight data bits from duplicate D0 lower byte are applied by way of terminals 3/0 to AND-gates 161.

Figure 8B:
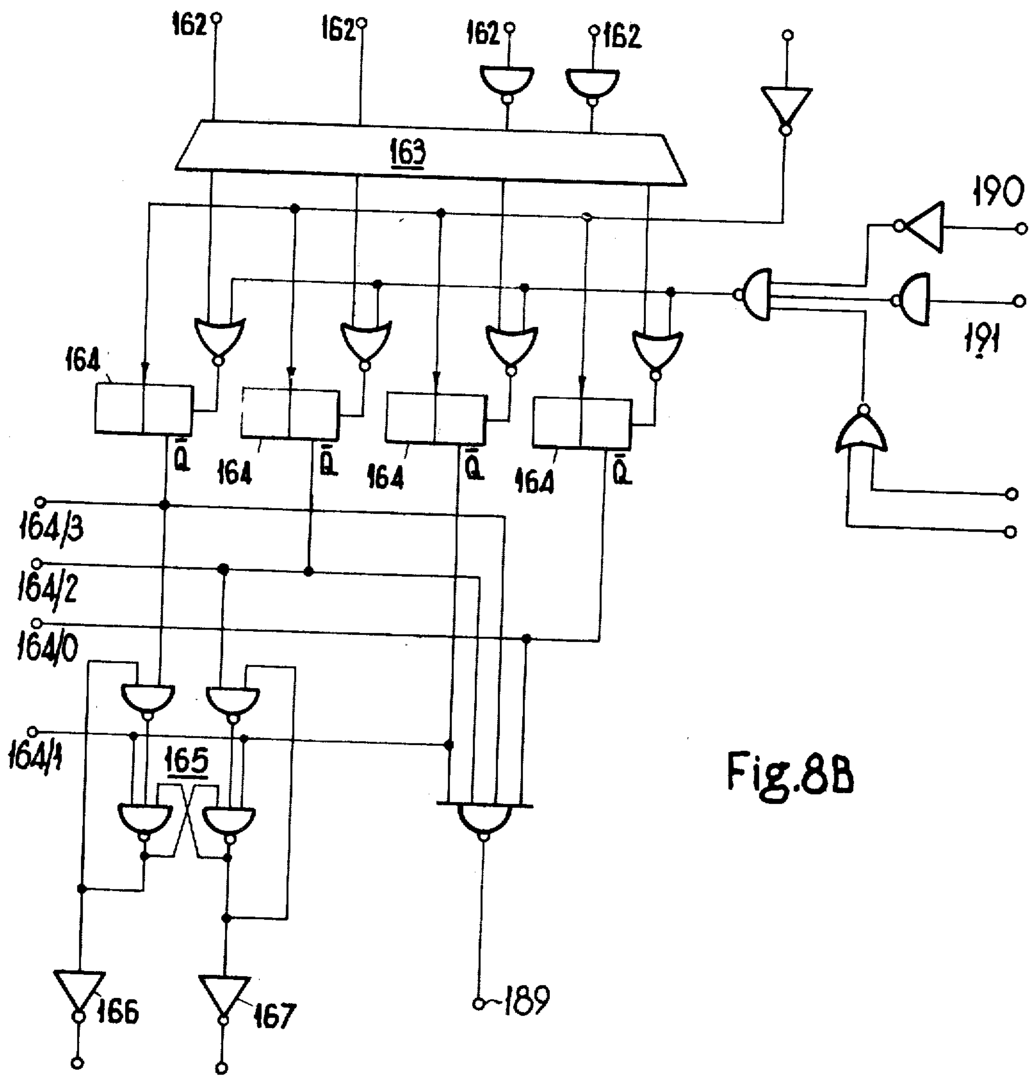

Referring to FIG. 8B, bits 0–3 of the address lower byte from the channels CH0 or CH1 are applied to terminals 162, this address being in wired-OR connection with the address applied to terminals 140 or 141 in FIG. 7. A decoder 163 then produces a 0 on one of four outputs according to the address, the normal 1 outputs clearing corresponding toggles 164. Additional clear inputs to the toggles are provided if the address lower byte bit-7 (applied to terminal 190) is a 1 or if the parity of the address lower byte (on terminal 191) is incorrect.

The left-hand output of the decoder 163 is a 'lock-out duplicate D0' output, and the second output is a 'lock-out duplicate D1' output. These outputs are applied to a latching toggle circuit 165 which has normal outputs 0 at terminals 166 and 167. These outputs are applied to the corresponding terminals in FIG. 8A, and are gated with the response signals on terminals 89/0 and 89/1 (from duplicates D0 and D1 respectively) to enable the data gates 160 and 161.

After effecting a data transmission the toggle 165 is unlatched by application of an appropriate address lower byte to terminals 162 which sets the third toggle 164 the output of which resets the toggle 165.

In addition to the transmission of the interrupt data itself the data-out circuitry also transmits other data, as follows. Gate 168 provides an indication of a toggle 165 reset operation: gate 169 provides an indication of a "lock-out D0" condition at toggles 164, and gate 170 of a "lock-out D1" condition. This data would be transmitted instead of the interrupt data in the absence of any response signal.

The fourth toggle 164 provides an enabling signal for gates 180-184 to read, respectively, the "lock-out D0" toggle 165 condition, the "lock-out D1" toggle 165 condition, the duplicate D0 partition toggle condition (via terminal 185), the duplicate D1 partition toggle condition (via terminal 186), and finally a parity bit for this data.

All four toggles 164 provide a parity bit at terminal 189 (a 1 arising from one 0 output from a toggle 164) which is applied to the other half of the duplicate selector circuit, for the upper byte. This upper byte circuitry is supplied with the two lockout signals at terminals 187 and 188 and does not therefore require the logic circuitry of FIG. 8B.

I claim:

1. For a data processing system including at least one data processor, a plurality of peripheral equipments and a plurality of input/output channels connecting said peripheral equipments to said data processor, A. an interrupt arrangement connected to an associated one of said input/output channels for connection to said data processor;

B. each of said peripheral equipments being connected to said interrupt arrangement for transmitting interrupt requests to said interrupt arrangement, said interrupt arrangement comprising two duplicate units, each duplicate unit comprising:

i. a plurality of storage elements for storing interrupt requests from said peripherals, each interrupt request being stored in corresponding said storage elements in both of said duplicate units;

ii. means responsive to instruction signals from said data processor to read out contents of selected ones of said storage elements for transmission to said processor via said associated channel;

iii. means for comparing the contents read out of the storage elements in the two duplicate units and for preventing said contents from being transmitted to the processor in the event of any disparity between said contents in respect of said two duplicate units; and iv. means responsive to further instructions from said processor transmitted over said associated input/output channel in response to the failure of transmission of said contents of said storage elements, said means responsive to said further instructions causing predetermined test operations on said storage elements to locate any faulty elements and to lock out any said faulty elements from normal operation.

2. An interrupt arrangement according to claim 1, connected to said data processor by two of said input/output channels, said interrupt arrangement comprising selector means responsive to seizure of either of said two input/output channels by said processor, said selector means transmitting instructions from said processor on either of said two input/output channels to both of said duplicate units.

3. An interrupt arrangement according to claim 1 wherein each said duplicate unit further comprises:

means for recognising interrupt requests stored in predetermined ones of said storage elements as immediate interrupt requests; and means for producing an interrupt signal for application to said processor on recognition of such an immediate interrupt request.

4. An interrupt arrangement according to claim 3, for use in a data processing system having a plurality of data processors, wherein said means for producing an interrupt signal comprises:

means for receiving data representing priorities of processes currently running on the respective processors;

means for identifying the lowest of said priorities; and means for directing a said interrupt signal to the processor with which that lowest priority is associated.

5. An interrupt arrangement according to claim 4, wherein each said duplicate unit further includes:

a register for storing a priority of a process which is waiting to run on one of said processors; and means for comparing the priority stored in said register with said lowest priority and for producing an interrupt signal in the event of the former priority being higher than the latter.

6. An interrupt arrangement according to claim 3 wherein each duplicate contains a plurality of groups of said storage elements, said groups having respective lock-out circuits any selected one of which is settable in response to a said further instruction, each said lock-out circuit being effective, when set, to prevent any requests stored within that group from being recognised as immediate requests.

7. An interrupt arrangement according to claim 1 wherein each said duplicate contains a plurality of groups of said storage elements, said groups having respective lock-out circuits any selected one of which is settable in response to a said further instructions from the processor, each said lock-out circuit being effective, when set, to prevent the contents of the elements within that group from being read out.

8. An interrupt arrangement for use in a data processing system which comprises at least one data processor, a plurality of input/output channels, and a plurality of peripherals which are accessible to the processor via the channels, the interrupt arrangement being connected to a said input/output channel of the system and comprising:

a plurality of storage elements for storing interrupt requests from said peripherals;

means responsive to instructions from said processor via said input/output channel to read out contents of said storage elements in that duplicate unit for transmission to said processor via said channel;

means for recognising interrupt requests stored in predetermined ones of said storage elements as immediate interrupt requests; and means for producing an interrupt signal for application to said processor on recognition of such an immediate interrupt request.

* * * * *